United States Patent [19]

Allen et al.

[11] Patent Number: 4,577,305

[45] Date of Patent: Mar. 18, 1986

[54] STEREOPHONIC MOTION PICTURE PHOTOGRAPHIC SOUND-TRACKS COMPATIBLE WITH DIFFERENT SOUND PROJECTION FORMATS AND RECORD AND PLAYBACK APPARATUS THEREFORE

[75] Inventors: Ioan R. Allen, Tiburon; Craig C. Todd, Muir Beach, both of Calif.

[73] Assignee: Dolby Laboratories Licensing Corporation, San Francisco, Calif.

[21] Appl. No.: 475,036

[22] Filed: Mar. 14, 1983

[51] Int. Cl.$^4$ .......................... G11B 7/20; H04R 5/00
[52] U.S. Cl. .......................................... 369/86; 369/89
[58] Field of Search ................ 369/86, 89, 92; 352/1, 352/8

[56] References Cited

U.S. PATENT DOCUMENTS

| | | | |
|---|---|---|---|
| 3,845,245 | 10/1974 | Takahashi | 369/89 |
| 3,982,069 | 9/1976 | Takahashi | 369/89 |
| 4,044,207 | 8/1977 | Vlahos | 369/120 |

OTHER PUBLICATIONS

Bauer et al.; A Compatible Stereo-Quadraphonic (SQ) Record System; Journal of the Audio Eng. Soc.; Sep. 71; vol. 19, No. 8; pp. 638–646.

Durbin; Playback Effects from Matrix Recordings; Journal of the Audio Eng. Soc.; Nov. 72; vol. 20, No. 9; pp. 729–733.

Primary Examiner—Robert L. Richardson
Attorney, Agent, or Firm—Majestic, Gallagher, Parsons & Siebert

[57] ABSTRACT

Discrete four-channel photographic (optical) motion picture sound-tracks are disclosed that are compatible with existing monophonic and stereo variable area (SVA) theatre projection equipment. Six track and four track embodiments are disclosed. In the four track embodiments 4-4-4 matrix encoding is employed in producing the sound-track. Apparatus for recording and reproducing the compatible four-channel sound-tracks are also disclosed.

21 Claims, 20 Drawing Figures

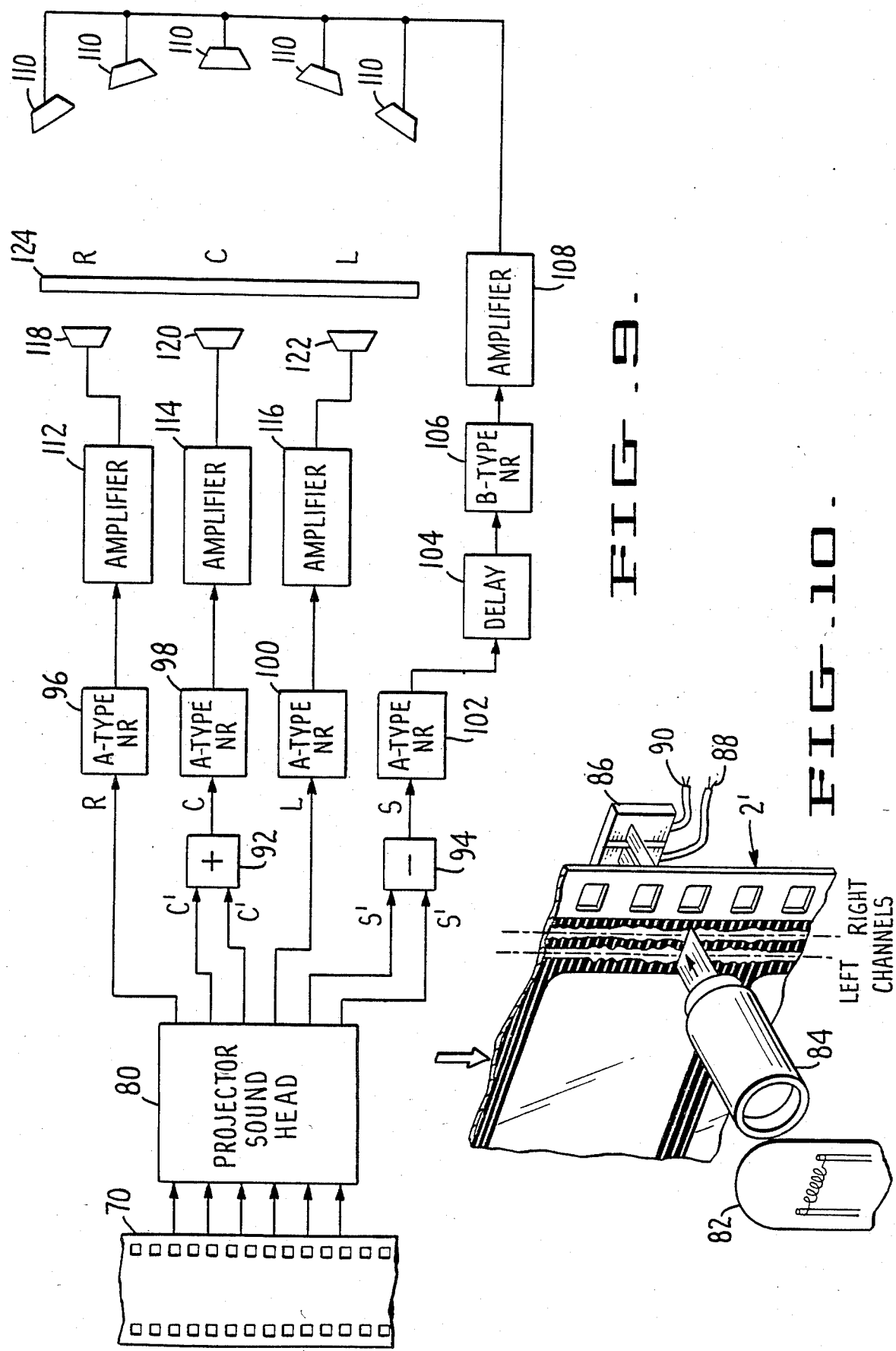

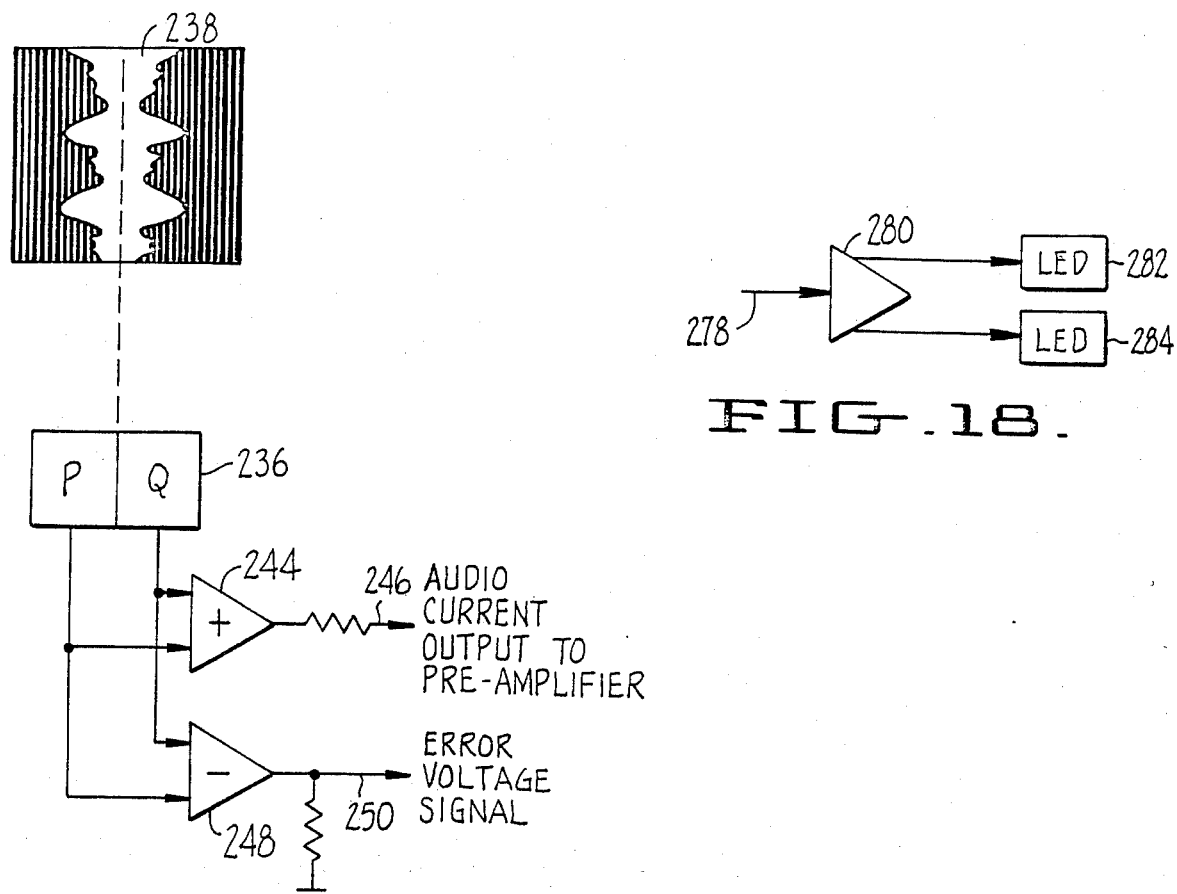
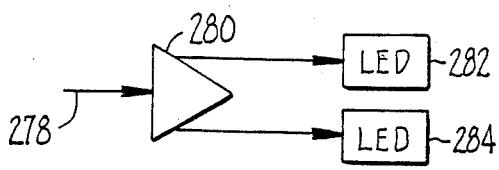
FIG.18.
FIG.15.
FIG.17.
FIG.16.

ative optical sound-track format, is called the "dual-bilateral" (or "double-bilateral" or "duo-bilateral") sound-track. This format has two bilateral elements within the same sound-track area, thus providing further immunity from illumination non-uniformity errors.
STEREOPHONIC MOTION PICTURE PHOTOGRAPHIC SOUND-TRACKS COMPATIBLE WITH DIFFERENT SOUND PROJECTION FORMATS AND RECORD AND PLAYBACK APPARATUS THEREFORE

BACKGROUND OF THE INVENTION

1. Field of the Invention

The invention relates generally to photographic sound-tracks for motion picture films. More particularly, the invention is directed to motion picture photographic (generally referred to as "optical") sound-tracks that provide four discrete channels (left, center, right and surround—L, C, R, S) while maintaining compatibility with theatre equipment adapted for playing films recorded in the widely used two-track stereo variable area (SVA) format in which the four channels (L, C, R, S) are matrix encoded onto two optical film tracks.

2. Background Art

Optical sound-tracks for motion pictures were first demonstrated around the turn of the century, and since the 1930's have been the most common method of applying sound on film. The principle of operation is to have an exciter lamp which illuminates a narrow slit, perpendicular to the direction of film travel. A lens focusses the image of the slit onto the film sound-track, which runs parallel to the direction of film travel, and lies between the picture and the sprocket holes. Behind the film a photocell or solar cell detects the amount of light being passed through the film, and the current or voltage generated by the cell is amplified and sent ultimately to the theatre loudspeaker(s). The transmission of light through the film is varied by either variations in density (an essentially obsolete technique) or by variations of width, where an ideally transparent varying width of sound-track is situated within an ideally opaque surrounding. This latter type of sound-track is known as "variable area".

The first variable area sound-tracks had one fixed edge, with the other edge a distance apart which varied with the required audio modulation. This type of optical sound-track is referred to as "unilateral". The varying clear width causes the required modulation in light transmission received by the cell. It was realized in the late 1930's that errors in light uniformity along the length of the slit could cause distortion components; for example, a fall-off in illumination at that end of the slit that corresponded to peak modulation level could cause significant second-harmonic disortion. In an effort to reduce this effect and other geometric distortion components, the "bilateral" variable area track was introduced. This format has two modulated edges, identical mirror images around a fixed centerline. This technique is immune to constant-slope slit illumination error, but will develop some slight second and third harmonic distortion components under parabolic light error conditions.

A later development, which is now the standard monaural optical sound-track format, is called the "dual-bilateral" (or "double-bilateral" or "duo-bilateral") sound-track. This format has two bilateral elements within the same sound-track area, thus providing further immunity from illumination non-uniformity errors.

In the mid 1970's stereo variable area (SVA) tracks became increasingly popular, in which two independently modulated bilateral sound-tracks are situated side by side in the same area as the normal monaural (mono) variable area track. A two element solar cell is used in this case to provide two independent output signals, one derived from each of the two bilateral sound-tracks.

With the exception of the Fantasound system used for the motion picture *Fantasia* in 1941, (which used two interlocked 35-mm films, one with picture and the other carrying only multiple sound-track elements), no multi-channel optical sound-tracks were used commercially prior to the mid-1970's. Several systems have been developed since 1953 which use magnetic stripes to carry multi-channel sound on 35-mm and 70-mm films, but prints of this type cost much more than films with optical sound-tracks. This high cost and various technical difficulties have precluded widespread use of magnetic stripes to achieve stereo sound in motion picture theaters.

However, as early as 1936 workers in the art experimently demonstrated independent modulation of variable area optical sound-track elements in the normal sound-track area to achieve two separate sound channels. One reason that these proposals were not widely adopted at the time was the difficulty of projector modification, resulting from the necessary incorporation of diverging optics and two separate photo-electric tubes. Even more importantly, these proposals suffered from the drawback that the substantially narrower track width for each channel of information resulted in at least a 3 dB decrease in signal-to-noise ratio, making the arrangement impractical for commercial use. Even though a 3 dB increase in film grain noise might be tolerable, optical sound-tracks pick up dirt and scratches, and the fifty percent reduction in track width makes these impulse noises unacceptable. What was missing and remained unavailable until the late 1960's was an effective noise reduction system that would restore the lost signal-to-noise ratio without introducing undesirable audible side-effects.

In the early 1970's Dolby Laboratories introduced its professional A-Type noise reduction system to the motion picture industry. A number of films were recorded with mono sound-tracks encoded with A-Type noise reduction for performance in theatres having the complementary A-Type decoding equipment. Shortly thereafter Eastman-Kodak and RCA began new investigations into two-track 16-mm stereo optical film sound-tracks. Miniature silicon solar cells had now made projector conversion much easier, and additionally, Dolby noise reduction was employed to solve the narrow track noise problem. Dolby Laboratories extended this development to 35-mm film for professional theatrical use; the resulting sound-track format, optical stereo variable area (SVA), employs two independent bilateral variable area tracks each having a width of 0.033", separated by a septum of 0.010". This makes a total width of 0.076", the same as used for the standard mono format. Thus, some compatibility is provided with theatres having only mono equipment.

The two-track SVA format has become very successful commercially. Over four thousand theatres worldwide are equipped to playback such films in stereo and over three hundred films have been released having some or all of the prints in that format. Some films, including such successful films as *Star Trek* and *Star Wars*, have been released with all optical sound-track prints using the two-track SVA format.

In recent years, most two-track SVA format films have been produced with four channels of sound (L, C, R and S) matrix encoded onto the two SVA tracks. When played in theatres, the two SVA tracks are applied to a matrix decoder in order to recover the original four channels. Such an arrangement is generally referred to as a 4-2-4 matrix. The particular matrix used, denoted the MP matrix, is a simple symmetrical matrix in which: (1) the left and right channels are recorded onto the respective left and right optical tracks; (2) the center channel is recorded in phase and 3 dB down in amplitude on both tracks; and (3) the surround channel is recorded out of phase and 3 db down in amplitude on both tracks. One major advantage of this format is that 4-channel decoding is not essential, in that a two channel playback will reproduce the center channel between L and R in the same way as a stereophonic phonograph record or an FM stereo broadcast.

On the other hand, a 4-2-4 matrix system has much worse interchannel crosstalk than a discrete channel system. The apparent separation can be improved over and above the theoretical 3 dB between adjacent channels by use of logic techniques, but the separation relaxes to this 3 dB figure between adjacent channels when signals are sent into all channels simultaneously.

Various discrete four-track optical sound-track systems have been proposed over recent years and, a couple of films have been released with one or more experimental prints in such formats. More recently, a four-track discrete optical format has been proposed in which the L, C, R and S tracks lie within the standard 0.076" width and are separated by three septa of about 0.009" each. Compared with a two-track SVA print, the signal-to-noise ratio of each track is degraded by over 4 dB, requiring severe electronic noise reduction techniques to compensate the grain noise build-up (and consequently placing greater demands on accuracy of frequency response, etc.), and special print processing to reduce the film's pick up of dirt and scratches.

None of the discrete optical multi-track systems in the prior art provide a format compatible with the two track SVA format. Due to the economics of film distribution (dual inventories, e.g. releasing prints in multiple formats, are costly), incompatible sound-track formats are unlikely to get used in more than a few showcase theatres.

It is therefore an object of this invention to provide an improved motion picture optical sound-track format.

It is a further object that the improved format provide four discrete channels.

It is yet a further object that the improved format be compatible with both the existing matrixed two-channel SVA format and the standard mono photographic sound-track format.

SUMMARY OF THE INVENTION

In accordance with the teachings of the present invention, the above and other objects are satisfied by the provision of a class of four- and six-track optical sound-track formats that provide four discrete channels (i.e., substantially infinite separation between any pair of the four channels), while maintaining compatibility with the established two-track SVA format and the standard mono format.

The left hand track of the two-track SVA format carries the left total information (LT):

$$LT = L + 0.7C - 0.7jS,$$

where j indicates a 90 degree phase shift. The right hand track, designated RT (right total) can be represented as:

$$RT = R + 0.7C + 0.7jS.$$

The information carried by the LT and RT tracks in the SVA format sets limits on the possible forms that can be taken by a compatible discrete four channel format. That is, to achieve compatibility, it is essential that any new format provides essentially the same total information within each LT and RT track location such that existing two-track SVA playback equipment can effectively read the new format as though it were the present SVA format.

The class of compatible four-track and six-track formats includes, (a) formats with three tracks within each of the LT and RT track widths without the necessity for any matrix encoding, and (b) formats with two tracks within each of the LT and RT track widths in combination with a 4-4-4 matrixing technique.

In the case of the six-track compatible format, the three tracks overlaying the LT track location carry left (L), center (C) and surround (S) information with appropriate amplitude and phase relationships as will be described. Similarly, the three tracks overlaying the RT track location carry right (R), center (C) and surround (S) information. Various permutations of track location, width and characteristics (bilateral, unilateral, etc.) are possible within these parameters.

In the case of the four-track compatible format with 4-4 matrix encoding, two tracks overlay each LT and RT track position. The four tracks will carry multiple combinations of left, center, right and surround. The matrix encoding is suth that when a 2-4 two-track SVA decoder is used in playback, essentially the same signals are recovered as if the print were a two-track SVA print, whereas if 4-4 matrix decoding is used, the result is the original L, C, R and S channels with theoretically infinite interchannel matrix decoding separation.

Four tracks with matrix encoding have several advantages over the six-track approach. First, the four-track approach allows higher instantaneous modulation in any given channel (L, C, R, S), except for the limiting case when the maximum signal level is applied to all four channels simultaneously. In that case, both the six-track and four-track formats would carry the same signal amplitudes. Secondly, four tracks are easier to record because the recording can be accomplished using one or two conventional four-string light valves, whereas a six-track format would likely require CRT (cathode ray tube) or laser beam recording techniques.

Although they will be described in connection with 35-mm motion picture films, aspects of the present invention are applicable to other film sizes, and also to other forms of recording media.

BRIEF DESCRIPTION OF THE DRAWINGS

FIG. 7 is a block diagram of apparatus for recording a four channel/six-track SVA compatible optical sound-track in accordance with an embodiment of the invention.

FIG. 9 is a block diagram of apparatus for playing back a four channel/six-track SVA compatible optical sound-track in accordance with an embodiment of the invention.

FIG. 10 is a perspective view of a conventional SVA sound head apparatus employing a split solar cell.

FIG. 15 is a simplified block diagram of an embodiment showing the use of two solar cell pairs to read each bilateral track of a two-track motion picture film.

FIG. 16 is a block diagram of signal processing useful with the signals derived in the embodiment of FIG. 15.

FIG. 17 is a block diagram showing the use of the processed film lateral location error signal to provide visible indication of error.

FIG. 18 is a perspective view showing the use of the processed film lateral location error signal to control the solar cell position.

FIG. 19 is a block diagram showing a further use of the processed film lateral location error signal to control the film guide roller.

DETAILED DESCRIPTION OF THE PREFERRED EMBODIMENTS

Figure 1:
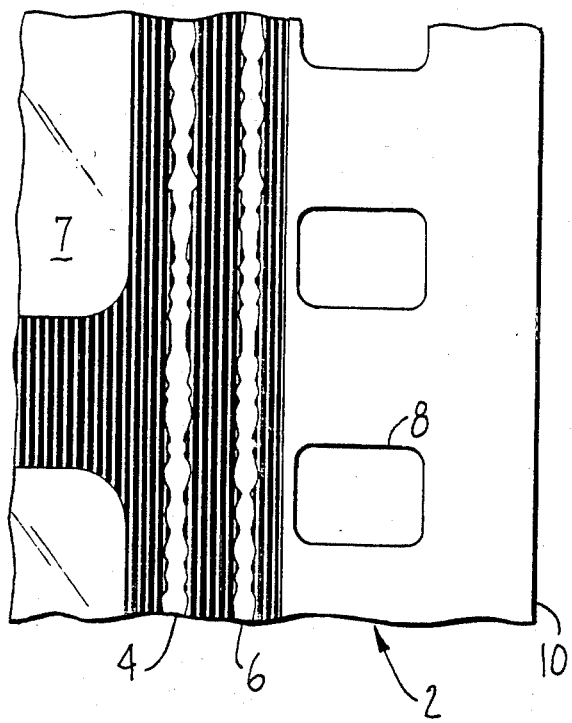
FIG. 1 is a representation of a portion of a motion picture film print illustrating a standard mono dual-bilateral photographic (optical) sound-track.

Referring now to FIG. 1 of the drawings, a representation of a typical conventional monaural dual-bilateral variable area sound-track on a segment of 35-millimeter motion picture film print 2 is shown. The duplicate information in the tracks 4 and 6 reduces distortion in the event of uneven slit illumination during playback. The sound-tracks are variable width clear areas in an otherwise opaque region between the picture 7 and the sprocket holes 8 near the right film edge 10.

Figure 2:
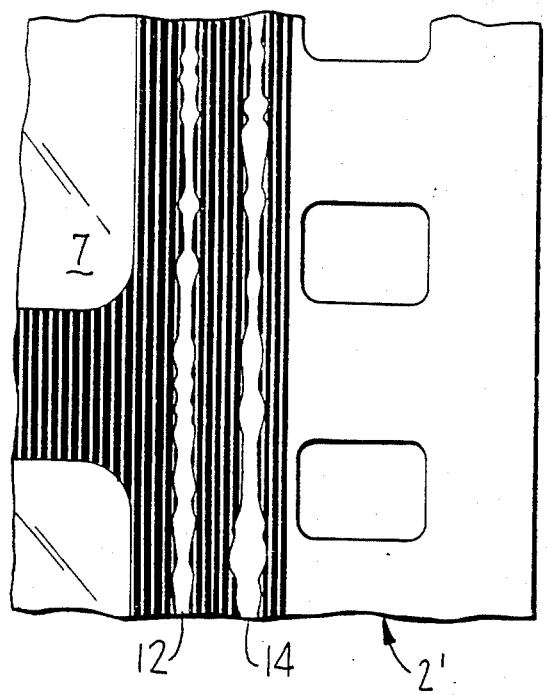
FIG. 2 is a view similar to FIG. 1, illustrating a two-track stereo variable area (SVA) optical sound-track.

In a similar view in FIG. 2, another segment of 35 millimeter motion picture film print 2' shows a representation of a typical SVA stereo optical sound-track. The sound-track is located between the sprocket holes and the picture frames. With the SVA format, each bilateral variable area track occupies a maximum width of 0.033", and a 0.010" septum separates the two tracks. In the standard SVA format the two tracks are encoded with A-Type noise reduction and are also matrix encoded with four channels of information (left, center, right and surround—L, C, R and S). The audio carried by the left track LT (12) and the right track RT (14) is an exaggerated example to show that each bilateral sound-track is independently modulated. A center front signal is recorded with identical amplitude and phase on the two sound-tracks; as a large portion of most film sound-tracks represents dialog intended to be reproduced from a center front loudspeaker behind the projection screen, it will be realized that for much of the time the two tracks will appear identical, and the extreme difference between the two tracks shown in the figure will only be seen occasionally in a normal motion picture sound-track. The surround channel is additionally encoded with B-Type noise reduction. The 4-2 encode matrix is of the form:

| L | C | R | S | |
|---|---|---|---|---|
| 1 | 0.7 | 0 | −0.7j | LT |
| 0 | 0.7 | 1 | 0.7j | RT | and the 2-4 decode matrix is of the form:

| LT | RT | |
|---|---|---|
| .35 | 0 | L' |
| .25 | .25 | C' |
| 0 | .35 | R' |
| .25 | −.25 | S' | where L', C', R' and S' indicate the four decoded channels, which are not identically the original L, C, R and S channels due to cross-talk.

The information carried by the left track is thus:

$$LT = L + 0.7C - 0.7jS$$

and the information carried by the right track is:

$$RT = R + 0.7C + 0.7jS.$$

In other words, all of the left or right channel information is exclusively applied to either the respective left or right tracks, while both tracks carry the center channel information in phase and 3 dB down in amplitude. The surround information is carried 3 dB down in amplitude in both channels at minus 90 degrees phase in the left channel and plus 90 degrees phase in the right channel. To provide compatibility, the new formats according to the present invention simulate left and right tracks carrying the above information.

According to the four channel/six-track format of the present invention, three tracks overlay each of the former LT and RT track locations. One of the three "left" tracks carries only left channel information, while one of the three "right" tracks carries only right channel information. One track on each side carries in-phase center channel information and the remaining two tracks (one on each side) carry out-of-phase surround channel information. Preferably, the left and right tracks are of the same width and in order to achieve maximum compatibility with a 2-4 decoder, each center and surround track is 0.7 times the size of the left and right channel tracks. In this way the summed energy will be compatible with the 4-2 matrix described previously. Although relative changes of track widths for individual channels are possible, there will be a trade-off of compatibility for other format playback and of signal-to-noise ratio in individual channels.

Figure 3:
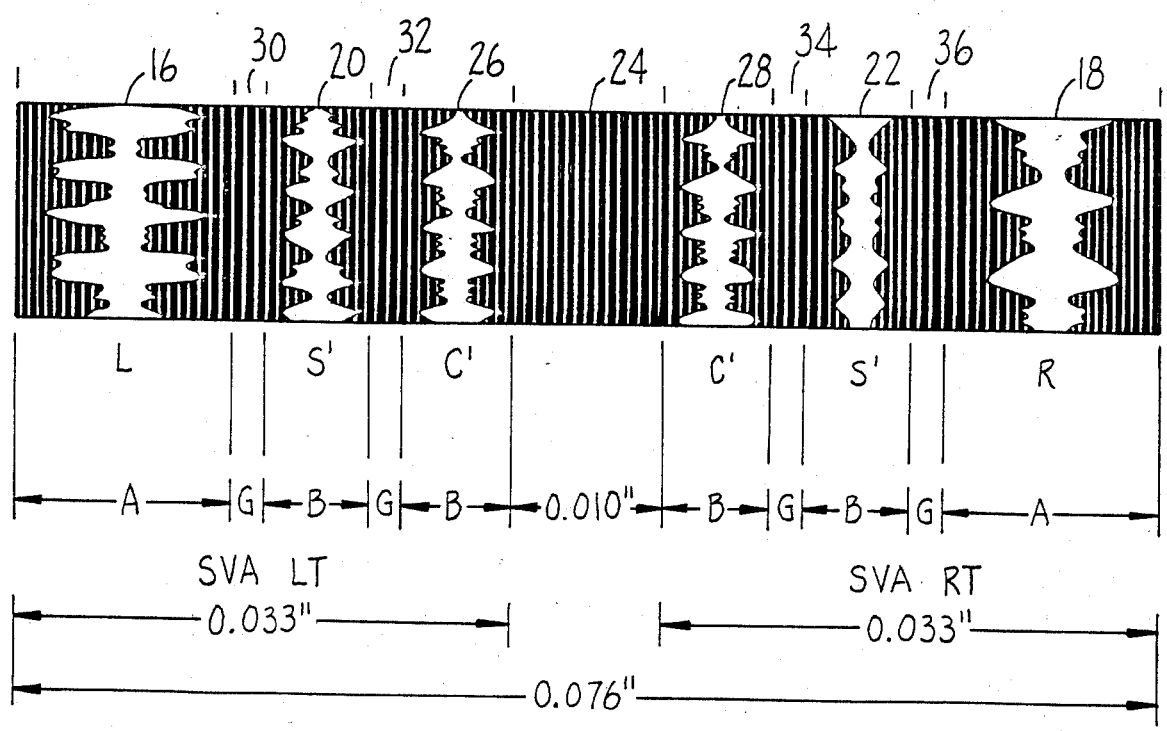
FIG. 3 is an illustration of a four channel/six-track SVA compatible optical sound-track layout in accordance with an embodiment of the invention.

One example of a four channel/six-track format according to the present invention is shown in FIG. 3 which depicts a segment of a 35-mm motion picture film print. The standard 0.076" sound-track width with a 0.010" septum and equal 0.033" left and right track modulation areas is preserved. However, within each of the composite left and right 0.033" track areas are contained three tracks separated by septa which may be as narrow as 0.002". At the outside of the LT and RT SVA equivalent tracks, are, respectively, left and right discrete tracks L (16) and R (18) shown with a width "A". At the center of each group of three are the partial are surround tracks S' (20 and 22) with a width "B". Adjacent the center septum 24 are the partial center tracks C' (26 and 28), also of width "B". As discussed above, the center and surround track widths are preferably each 0.7 times the left and right track width. Thus, the dimensions "A" and "B" are about 0.0120" and 0.0085", respectively. Throughout this application exact dimensions are set forth, but it will be understood that these are subject to some variation in practice. The various Figures are not exactly to scale. Each track is modulated to the same maximum amplitude level. Thus, each partial center and partial surround track carries 3 dB less signal than would a full width track with the same information. The left and right tracks, respectively, carry the in-phase left and right channel information. The partial center tracks carry the center channel information in-phase. The partial surround tracks carry the surround information out of phase (i.e., $-90$ degrees in the left track and $+90$ degrees in the right track). The dimension "G" for the septa 30, 32, 34 and 36 is preferably about 0.002". Although the narrow septa could be widened, the result would be to reduce the signal-to-noise ratio and to increase the annoyance resulting from dirt and scratches as the tracks narrowed. The format shown in FIG. 3 provides a total track width of 0.058" compared to 0.066" for the standard two-track SVA format resulting in a total signal-to-noise loss of only 0.6 dB when all tracks are modulated.

All six tracks as shown in FIG. 3 are bilateral variable area tracks. The relative positions of each group of three tracks within the former LT and RT locations can be arranged in any permutation though it seems preferable that those channels shared on both LT and RT (e.g., C and S) should be closest to the septum so as to minimize the effect of any azimuth errors.

In order to permit the use of narrow septa, such as 0.002", means for indicating errors and possibly dynamically correcting the lateral sound-track location will be necessary. Details of such a system form the subject matter of a U.S. patent application of Ioan R. Allen, entitled Improvements in Apparatus for Reproducing Motion Picture Film Photographic Sound-Tracks, filed the same day as the present application, Ser. No. 475,026, filed 3/14/83. In order to complete the disclosure of the present invention, portions of the specification of said other application relating to lateral sound-track location indication and connection are included herein following the description of the embodiment of FIG. 11.

Figure 4:
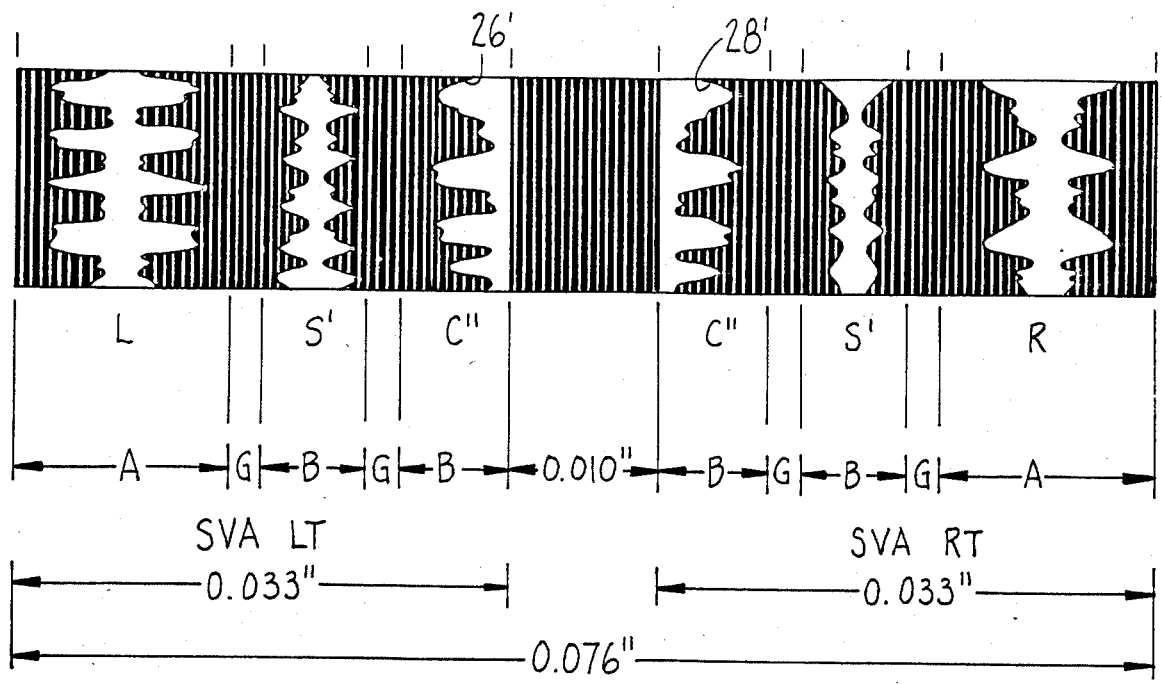
FIG. 4 is similar to FIG. 3 and shows an alternate embodiment of the invention.
Figure 5:
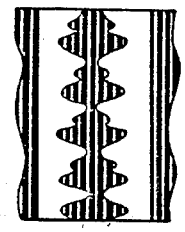
FIG. 5 is an illustration of an exemplary dual-unilateral optical sound-track.

According to the embodiment of FIG. 13 below (taken from said other application), it is desirable to provide a unilateral (instead of bilateral) track adjacent the centeral SVA 0.010" septum. Accordingly, in the embodiment of FIG. 3, or its variations, the tracks adjacent the septum (the C' tracks 26 and 28 in FIG. 3) are configured as unilateral tracks such that the unmodulated side of each track is adjacent the central septum. See FIG. 4. The unilateral configuration of the C" tracks 26' and 28' (or the S' tracks if they were located adjacent to the central septum) would be acceptable because the playback slit illumination along that 0.0245" width is likely to be uniform (bilateral tracks are used primarily to overcome variations in slit illumination), and there are still two modulated edges with opposite polarity. Thus, the use of unilateral tracks adjacent the central septum imposes further reasons for the C or S tracks being closest to the septum. If non-uniform slit illumination is of concern, the C or S tracks could be configured as dual-unilateral (e.g., inverted bilateral) tracks. Dual-unilateral tracks could be used for R and L, and these could be located adjacent the central septum. FIG. 5 illustrates a section of dual-unilateral variable area sound-track.

According to the four-track format of the present invention, two tracks overlay each of the former SVA LT and RT track locations. Although the four tracks are not assigned uniquely to carry the L, C, R and S channels, nevertheless by means of a 4-4-4 matrix encoding/decoding system, the four tracks when 4-4 matrix decoded yield four "discrete" channels in the sense that there is theoretically no cross-talk between pairs of channels. In order to provide compatibility with 2-4 matrix decoders used with the standard two-track SVA playback systems the 4-4-4 matrix is configured so as to provide the necessary information in each of the two sets of tracks overlaying the SVA LT and RT track locations.

Figure 6:
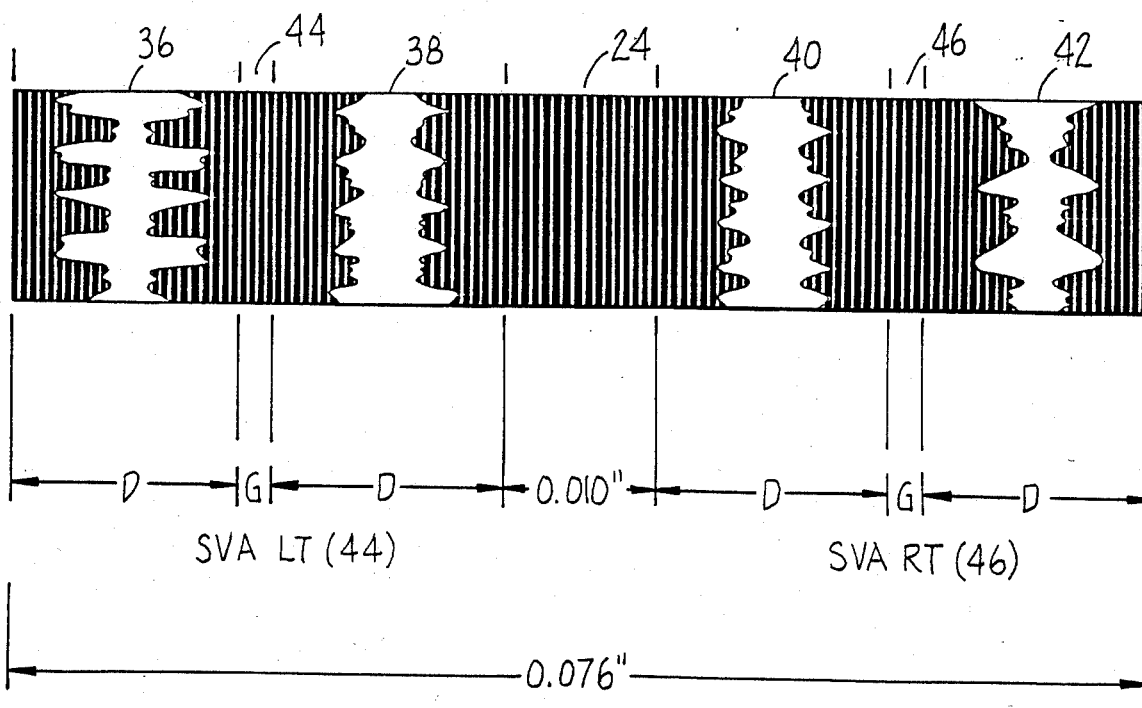
FIG. 6 is an illustration of a four channel/four-track SVA compatible optical sound-track layout in accordance with a further embodiment of the invention.
Figure 2:
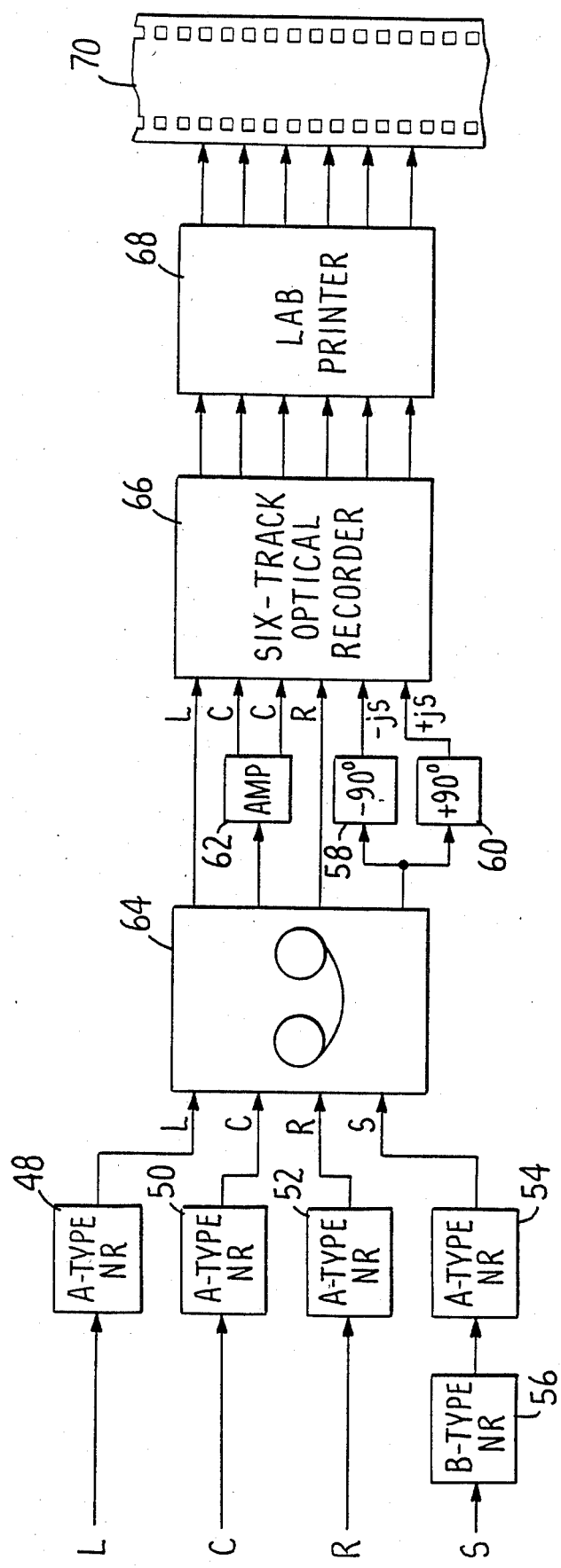

One example of the four channel/four-track format is shown in FIG. 6, which depicts a segment of 35-mm motion picture film print. As with the six-track format, the central 0.010" septum 24 is retained in the four-track format for compatibility with the two-track SVA system. However, because only four tracks (36, 38, 40, 42) are required instead of six, it may be acceptable to use spacings wider than 0.002" for the two septa 44 and 46 between the pairs of left and right tracks. If the signal-to-noise loss could be tolerated, three full 0.010" septa could be used, thus obviating a possibly mandatory need for sound-track position error correction and/or dynamic film positioning. Preferably, to maximize signal-to-noise ratio, narrow septa such as G=0.002", are used between the pairs of tracks. Also, the tracks are preferably of equal width (D=0.0155"), although as mentioned above, it is possible to compensate for unequal track width by adjusting the relative amplification levels but with a consequent re-allocation of signal-to-noise ratio among the tracks.

As in the case of the six-track format, the four tracks each can be bilateral. However, the tracks adjacent the central septum alternatively can be dual-unilateral (in the manner of FIG. 5) or even single unilateral if the effects of non-uniform slit illumination can be accepted.

One suitable 4-4 encode matrix for the four-track arrangement is as follows (designating the tracks as "W," "X," "Y" and "Z"):

| L | C | R | S | |
| --- | --- | --- | --- | --- |
| 0.7 | 0 | 0.7 | −j | W |
| 0.7 | 1 | −0.7 | 0 | X |
| −0.7 | 1 | 0.7 | 0 | Y |

-continued

| L | C | R | S | |
|---|---|---|---|---|
| 0.7 | 0 | 0.7 | j | Z |

Thus, the information carried by the respective four tracks is:

$$W = 0.7L + 0.7R - jS$$

$$X = 0.7L + C - 0.7R$$

$$Y = -0.7L + C + 0.7R$$

$$Z = 0.7L + 0.7R + jS.$$

The W and X tracks which overlay the LT track position when summed (taking into account the track widths) supply L+0.7C−0.7jS, while the Y and Z tracks which overlay the RT track position, when summed, provide R+0.7C+0.7jS. The 4-4 encoded four tracks thus carry the same information in the LT and RT track positions as does the two-track SVA format. The separation between pairs of channels when the 4-track discrete print is played back with a 2-track SVA matrix decoder is the same as if the film print were 4-2 encoded; i.e., −3 dB in adjacent channels and theoretically infinite for the opposite channel.

For 4-4 decoding, the decode matrix is of the form:

| W | X | Y | Z | |
|---|---|---|---|---|
| 0.35 | 0.35 | −0.35 | 0.35 | L |
| 0 | 0.5 | 0.5 | 0 | C |
| 0.35 | −0.35 | 0.35 | 0.35 | R |
| 0.5 | 0 | 0 | −0.5 | S |

The 4-4 encode matrix when multiplied by the 4-4 decode matrix yields as its product the identity matrix (I). Thus, the original four discrete channels L, C, R and S are recovered with the correct total power. For example, the center channel, C, is determined by $$C = 0.5x + 0.5y$$

$$C = 0.5(0.7L + C - 0.7R) + 0.5(-0.7L + C + 0.7R)$$

$$C = C.$$

If a 4-2 encoded film (e.g., a conventional two-track SVA print) is decoded with a 4-4 matrix decoder, the result is the same as with a 2-4 matrix decoder except that the resultant L' and R' have a 3 dB higher noise level. This can be overcome by providing 4-4 matrix playback equipment with the option to switch to a 2-4 matrix playback mode.

It is also possible to interchange the positions of the S and C channels in the 4-4-4 matrices to provide equivalent matrices. If this is done, the encode matrix takes the form:

| L | C | R | S | |
|---|---|---|---|---|
| 0.7 | 1 | −0.7 | 0 | W |
| 0.7 | 0 | 0.7 | −j | X |
| 0.7 | 0 | 0.7 | j | Y |
| −0.7 | 1 | 0.7 | 0 | Z | and the decode matrix takes the form:

| W | X | Y | Z | |
|---|---|---|---|---|
| 0.35 | 0.35 | 0.35 | −0.35 | L |
| 0.5 | 0 | 0 | 0.5 | C |
| −0.35 | 0.35 | 0.35 | 0.35 | R |
| 0 | 0.5 | −0.5 | 0 | S |

Other variations in the 4-4-4 matrix encoding and decoding that maintain 4-2-4 compatibility are possible. For example, the relative power levels of the four channels may be altered in order to optimize the modulation of the four tracks.

Another example of a compatible 4-4-4 matrix is as follows. In this matrix more track area is available for the center channel information. This is advantageous because most of the time the significant sound information is dialog which is carried by the center channel. The encode matrix is of the form:

| L | C | R | S | |
|---|---|---|---|---|
| 0.7 − 0.7j | 0.5 + 0.5j | 0 | 0.5 − 0.5j | W |
| 0.7 + 0.7j | 0.5 − 0.5j | 0 | −0.5 − 0.5j | X |
| 0 | 0.5 − 0.5j | 0.7 + 0.7j | 0.5 + 0.5j | Y |
| 0 | 0.5 + 0.5j | 0.7 − 0.7j | −0.5 + 0.5j | Z |

The decode matrix is of the form:

| W | X | Y | Z | |
|---|---|---|---|---|
| 0.35 + 0.35j | 0.35 − 0.35j | 0 | 0 | L |
| 0.25 − 0.25j | 0.25 + 0.25j | 0.25 + 0.25j | 0.25 − 0.25j | C |
| 0 | 0 | 0.35 − 0.35j | 0.35 + 0.35j | R |
| 0.25 + 0.25j | −0.25 + 0.25j | 0.25 − 0.25j | −0.25 − 0.25j | S |

FIG. 7 shows generally one way in which the invention contemplates the recording of a four-channel six-track motion picture sound-track. The L, C, R, S information channels are first applied to noise reduction encoders. Each channel is encoded with A-Type noise reduction in blocks 48, 50, 52 and 54, respectively. In addition, the surround channel S is encoded with B-Type noise reduction in block 56 prior to its A-Type encoding in order to provide additional noise reduction because in theaters, the surround channel speakers are closer to the audience and perceptible noise is therefore more annoying. A-Type noise reduction is described in the paper "An Audio Noise Reduction System" by R. M. Dolby in *J. Audio Engineering Soc.*, October, 1957, pp. 383–388. B-Type noise reduction is described in the paper "Dolby B-Type Noise Reduction System" (Parts 1 and 2) by R. Berkovitz and K. Gundry in *Audio*, September and October, 1973.

The noise reduction encoded L, C, R and S signals are recorded on a four-track magnetic master tape by recorder 64.

The surround channel information from the master tape is applied to blocks 58 and 60 that provide −90 degree and +90 degree phase shifting such that the amplitudes of the phase shifted signals are the same as the orginal surround channel input. The center channel from the master tape is split into two in-phase parts by splitter 62, each part having the same amplitude as the original center channel input. The six resulting signals are applied to the six-track optical recorder 66.

Conventional optomechanical techniques are not best suited to recording six independently modulated variable area tracks. While it may be possible to employ conventional light valves (such as are available from Westrex, Inc.), the use of light valves to record six separate elements would be a complicated procedure. Thus, various other techniques may be employed such as opto-acoustic couplers in connection with a scanning laser system, a cathode-ray direct optical imager or electron beam recording. Laser recording systems are described in "A High-Quality Optical Sound Recording System Using a Scanned Laser Beam" by T. Taneda, et al. in *J. S.M.P.T.E.*, February, 1980, pp. 95–97, and "Recording of Variable-Area Soundtracks Using a Laser Light-Modulating Device" by V. I. Glazunova, et al., *J. S.M.P.T.E.*, July 1980, pp. 525–527. A CRT system for recording a multi-track sound-track is described in "Comtrak-Combination Photographic Soundtrack" by J. Mosely, et al. in *J. S.M.P.T.E.*, September, 1981, pp. 762–767. The optical recorder 66 is, of course, configured to record a six-track format as described above.

The negative film produced by the optical recorder 66 is conventionally processed by a laboratory printer 68 to produce a motion picture film 70 having four channel/six-track sound-tracks as determined by the optical recorder 66 and the signals applied to it.

Figure 8:
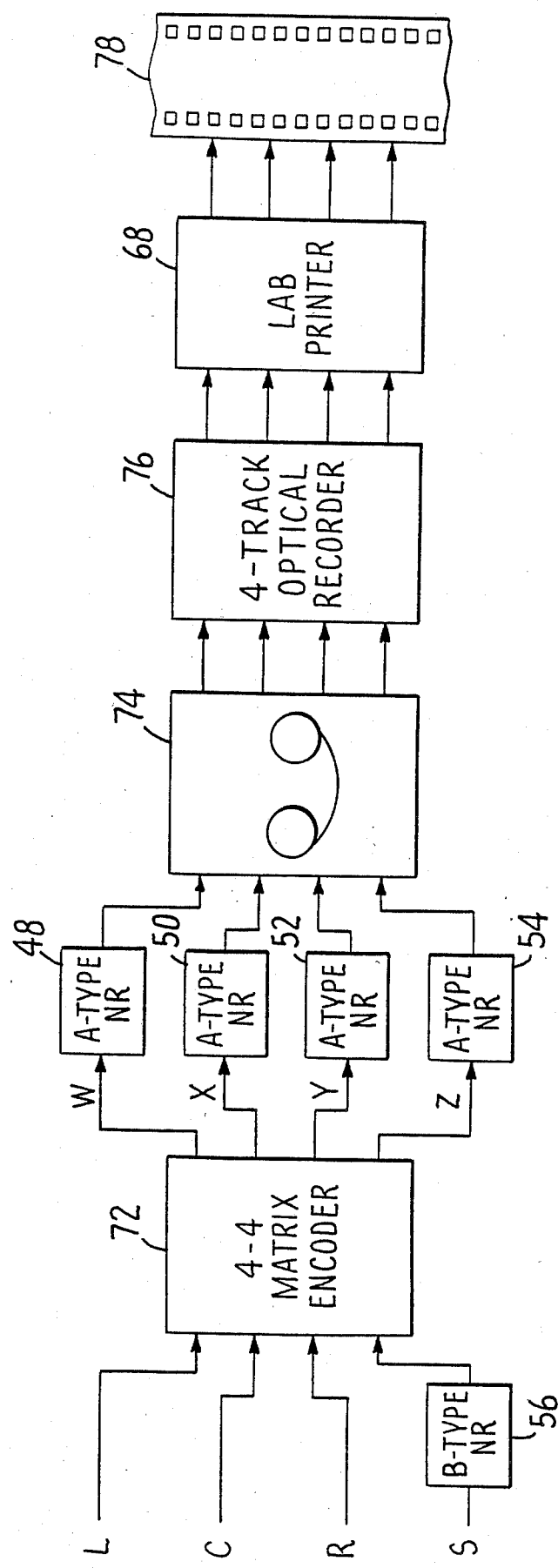
FIG. 8 is a block diagram of apparatus for recording a four channel/four-track SVA compatible optical sound-track in accordance with a further embodiment of the invention.

FIG. 8 shows generally one way in which the invention contemplates the recording of a four channel/four-track motion picture sound-track. The surround channel is first applied to a B-Type noise reduction encoder 56 (as used in the embodiment shown in FIG. 7). The encoded S channel along with L, C and R are then applied to a 4-4 matrix encoder 72 which has characteristics as described above. The W, X, Y and Z outputs of matrix encoder 72 are applied respectively to A-Type noise reduction encoders 48, 50, 52 and 54 (as used in the embodiment shown in FIG. 7). The A-Type encoded channels are then recorded on a four channel/four-track magnetic master tape by recorder 74. Alternatively, the signals may be A-Type encoded prior to their application to the matrix encoder. The four-track master tape provides the signals for the four-track optical recorder 76. Westrex four-string (ribbon) light valves can be employed, with separate modulation applied to each ribbon. Details of optical sound-track recording with light valves are set forth in the *Audio Cyclopedia* by Howard M. Tremaine, Second Edition, 1975, Howard W. Sams & Co., Inc., Indianapolis. Alternatively, any of the techniques usable in the optical recorder 66 in the embodiment shown in FIG. 7 are also usable. In this case, the optical recorder 76 is, of course, configured to record a four-track format as described above.

The negative film produced by the optical recorder 76 is processed by a laboratory printer 68, in the same way as the negative produced in the embodiment depicted in FIG. 7, to produce a motion picture film 78 having four-track sound-tracks determined by the optical recorder 76 and the signals applied to it.

In FIG. 9, one way in which the invention contemplates the playback of four channel/six-track sound-track films is shown. Using a conventional projector (not shown), a modified projector sound head 80 converts the six-track optical information into the six signals, R', C', C', L', S' and S', described above. The sound head 80 can employ a multi-element solar cell in the manner presently used for the playback of two-track SVA prints as shown in FIG. 10. Referring briefly to FIG. 10, which shows a typical SVA film playback, an exciter lamp 82 provides a light source that is focused by a slit lens 84 into a beam of light in the order of 0.084" wide and having a height in the order of 0.00125" for illuminating the sound-track width. The split solar cell 86 is located closely adjacent the film opposite the slit lens 84. The elements 82, 84 and 86 are aligned such that the respective left and right portions of solar cell 86 receive only the light modulated by the respective left and right tracks (LT and RT). Current outputs representing the LT and RT signals are thus present on the respective leads 88 and 90 attached to the split solar cell. Other arrangements for sound heads are well known in the literature. See, for example, the *Audio Cyclopedia*, supra.

It is possible to manufacture multi-element solar cells having the required number of elements within the 0.076" width for the six-track playback embodiment of FIG. 9. Such multi-element cells are also feasible for use in the four-track playback embodiment described below in connection with FIG. 11. The sound head arrangement in either case is otherwise the same as used in two-track SVA sound heads. The use of solar cells is preferred because of their low cost and ease of installation.

Referring again to FIG. 9, an alternative to a six-element split solar cell in the sound head 80 is to use diverging optics with individual solar cells or some other type of photosensitive pickups. Such techniques are well known in the literature. Other alternatives are to employ a scanning technique such as described in U.S. Pat. No. 4,124,784 to Johnson, et al. or the parallel processing technique described in U.S. Pat. No. 4,355,383 to R. M. Dolby.

The two C' outputs from the sound head 80 are additively summed in block 92 to provide the center channel signal. The S' outputs are subtracted in block 94 to provide the surround channel signal [e.g., $S=0.7 jS-(-0.7js)$].

The L, C, R and S channel signals are then applied to respective A-Type noise reduction decoders 100, 98, 96 and 102. The surround channel must also be applied to a delay line 104, which has a delay of about 75% of the front to back path length of the auditorium in which the system is used (usually in the range of 25 to 120 ms). The purpose of the delay is for temporal coherence and to subjectively reduce cross-talk from the L, C and R channels when standard SVA prints are being played back. Further details are set forth in U.K. Pat. No. 2,006,583 to Ioan Allen. The delay line output is applied to B-Type noise reduction decoder 106. Amplifier 108 applies the decoded and delayed surround channel signals to a multiplicity of surround speakers 110 located around the rear and sides of the auditorium in which the system is installed. The L, C and R signals are amplified by amplifiers 116, 114 and 112, respectively, and applied to the left, center, and right speakers 122, 120 and 118 usually located behind the motion picture projection screen 124.

Figure 11:
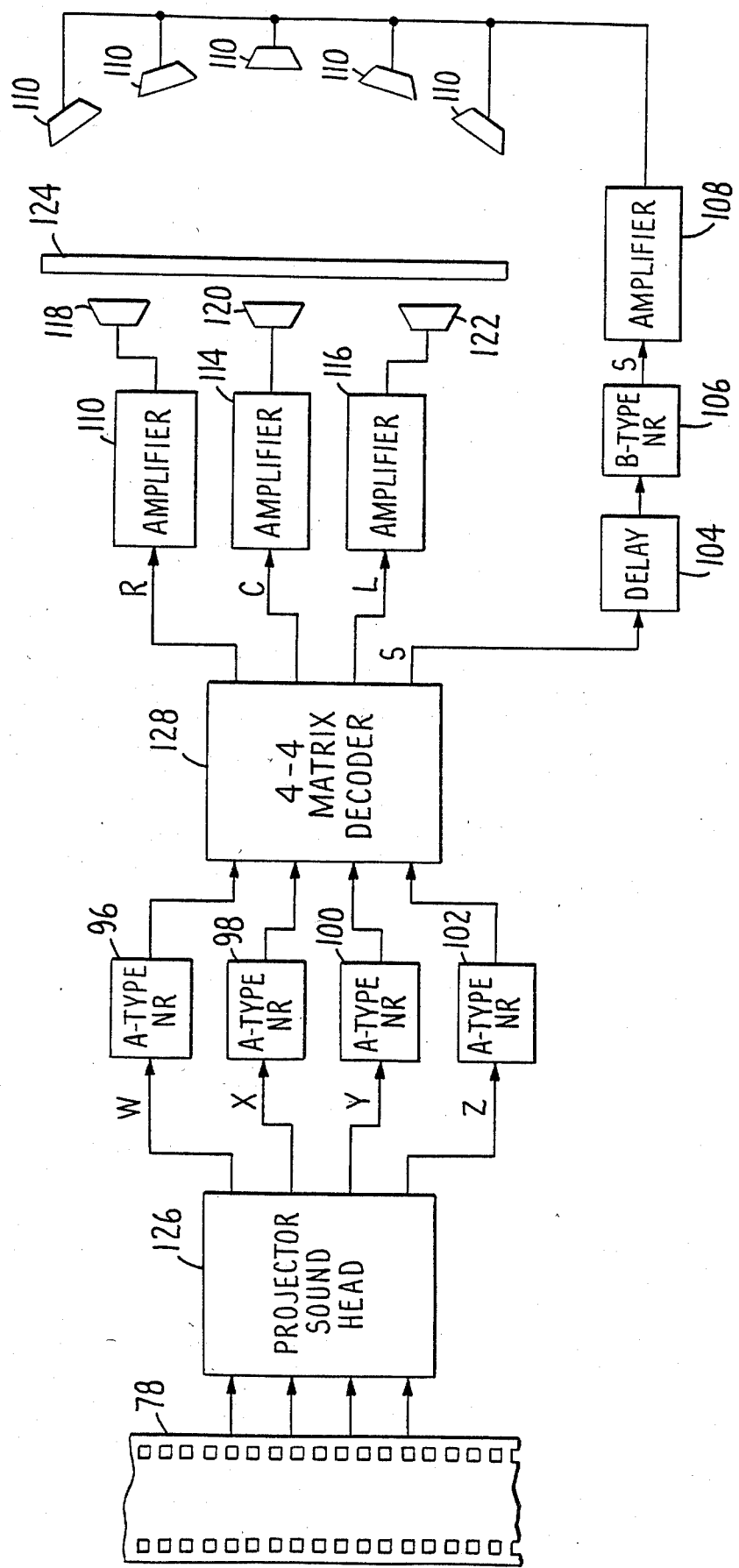
FIG. 11 is a block diagram of apparatus for playing back a four channel/four-track SVA compatible optical sound-track in accordance with a further embodiment of the invention.

In FIG. 11 one suitable arrangement for playing back four channel/four-track sound-track film is shown. The film 78 is played back in a conventional projector (not shown) having a modified sound head 126 which can include a multi-element solar cell or other arrangement as discussed in connection with sound head 80 in the embodiment shown in FIG. 9. The W, X, Y and Z channel signals from the sound head 126 are applied to respective A-Type noise reduction decoders 96, 98, 100 and 102 (as in FIG. 9). The decoded signals are applied to a 4-4 matrix decoder 128 having characteristics as described above. If the encoder is configured to A-Type encode the signals prior to application to the matrix (in the embodiment of FIG. 8), then for complementarity the A-Type noise reduction decoders are located after the 4-4 matrix decoder 128 in this FIG. 11 embodiment. Optionally, a 2-4 mxtrix decoder (not shown) can be provided to be switched into the system when playing 4-2 matrix encoded films. The matrix decoded surround channel S is applied to a delay line 104, a B-Type noise reduction decoder 106, amplifier 108 and surround speakers 110 as described in connection with FIG. 9. In like manner, the matrix decoded L, C and R signals are applied to respective amplifiers 116, 114, 110 and speakers 122, 120, 118 located behind the screen 124.

LATERAL TRACK ALIGNMENT

As discussed above, when very narrow septa are employed between track elements, as set forth in some of the embodiments of the present invention, it may be necessary to provide some means to assure proper lateral sound-track alignment with respect to the sound-head. The following material relates to lateral track alignment and is taken from said co-pending U.S. patent application of Ioan R. Allen.

There are several technical shortcomings with variable area formats, both mono and stereo. One major problem relates to track misalignment. Conventional sound-track width is limited to 0.076", which is the space allocated for the purpose between the picture area and sprocket holes. A width of 0.084" at the nominal sound-track location is illuminated with a thin beam of light by an exciter lamp/optical assembly slit arrangement. The light sensitive cell is located behind the film so that the sound-track area variations modulate the light reaching the pick-up cell. The arrangement thus allows a tolerance of $+/-0.004"$ to take account of any misalignment of the sound-track with respect to the slit and pick-up cell.

In most projectors, the lateral position of the film is adjustable by means of a moveable guide roller; the slit and lens assembly, light source and pick-up cell elements are installed in alignment and kept stationary with respect to each other. The normal procedure for guide roller adjustment is to play a special film known as a "buzz" track, in which two low level square wave signals, one of a low frequency and one high, are located outside the normal sound-track area, such that the inside modulation peaks are 0.084" apart; the recording is accurately centered over the 0.076" correct sound-track position. Thus, if the film sound-track position is correct, the 0.084" wide light beam slit will not illuminate either square wave signal. However, if the sound-track lateral position is improperly located to the left or right, a high frequency or low frequency buzz will be reproduced. The operator can then adjust the guide roller until the buzz disappears.

As discussed above, the two-track stereo variable area format (SVA) has two tracks occupying the same physical location and with the same maximum total width as a mono single or dual-bilateral track, but each carrying different audio information. A 0.010" septum separates the two bilateral tracks. Projection equipment for playing an SVA film employs a similar sound-head arrangement as for a mono film playback, but with a two-element solar cell nominally positioned so as to receive light independently on each cell from the two tracks. Lateral alignment of the film sound-track with respect to the light source/pick-up cells is obviously more critical than when playing a monaural film.

Following use of a buzz-track test film and guide roller adjustment to align the film sound-track position with respect to the optical assembly, a stereo optical sound-head requires the use of a further test film with tone bursts alternating between the two tracks; this is used to align the twin element solar cell with respect to the film/optical assembly combination. The cell position is adjusted until the reproduced cross-talk from channel to channel is minimum and equal (left-to-right and right-to-left), thus ensuring that the cell is laterally centralized with respect to the sound-track. This combination of procedures is effective provided that the mass produced film being played after alignment with the test films was not made from a misaligned printer, resulting in the sound-track being out of location on the film itself.

In practice, during the physical production of an optical sound-track, sound-track placement on the sound-track negative is normally correct to within 0.001". When prints are made from the negative though, errors as great as 0.004" can be introduced as a result of printer misalignment. Thus, the combined negative and positive errors can lead to a worst case error as great as $+/-0.005"$ on the print. If the projector is properly aligned by use of the described test films, such errors in the print are not a problem with monaural sound-tracks, or with two-track stereo variable area (SVA) films, because of the 0.010" septum between the two SVA tracks. However, if not only the film sound-track, but also the projector cell location is out of alignment, the result may be that peak signals from one track will be scanned by the wrong cell element. The audible results include distortion and, in some cases, image placement drift.

A further problem resulting from alignment errors of this type is a consequence of the solar cell picking up a signal emanating from the outside edge of the opaque sound-track area. Sound-tracks are developed in the laboratory with an added silver deposit, resulting in a better signal-to-noise ratio with conventional infra-red sensitive cells than would result were the sound-tracks to be composed of the original color dye. This redevelopment process involves an applicator wheel which deposits an ill-defined edge at each side of the sound-track. These edges will normally be outside the illuminated slit on the film during playback; if, however, misalignment results in their being scanned, an unpleasant rumble sound results.

Some amelioration of gross misalignment is possible by adjustment of the guide roller until an audible improvement in the reproduced sound is heard. However, if location errors could be accurately identified during the playback of a film, the projectionist could adjust the guide roller for correct alignment or, alternatively, automatic adjustment of the guide roller or solar cell position could be provided. This approach would be particularly useful in playing multiple track optical formats, such as discrete four-channel formats having four or more tracks. Examples of such formats are described in this application of Allen and Todd.

According to said application of Ioan R. Allen, significant information regarding track placement can be derived by dynamically processing and comparing the signals obtained by reading each half of a bilateral sound-track.

Figure 12:
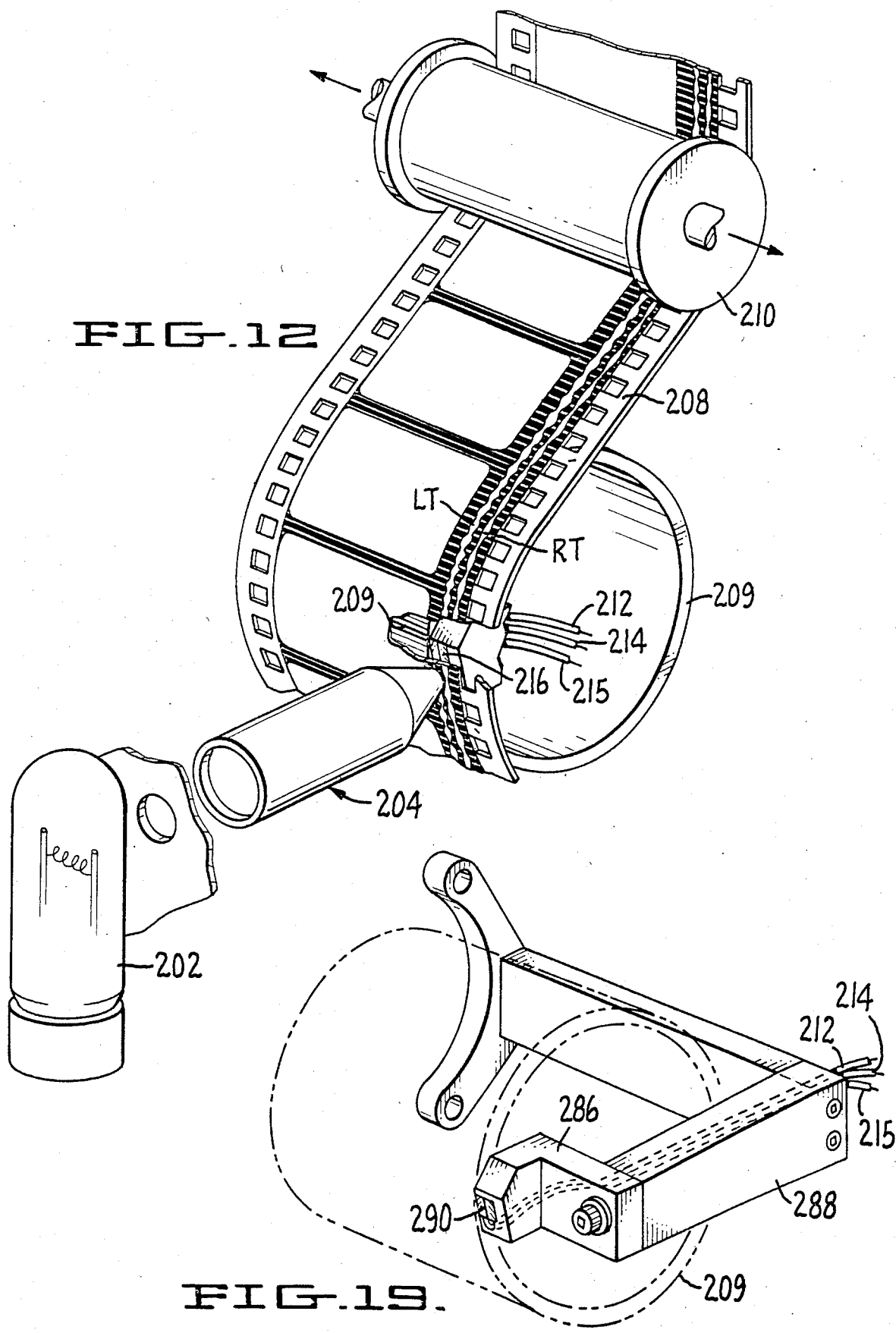
FIG. 12 is a perspective view of a conventional motion picture projector sound-head assembly.

Referring now to FIG. 12, a typical sound-head assembly is shown for use in a motion picture projector playing films with mono or stereo optical sound-tracks (an SVA stereo sound-track is shown). An exciter lamp 202 provides a light source that is focussed onto the film sound-track by a lens and slit assembly 204. This projected beam of light has a width in the order of 0.084" and a height in the order of 0.00125". For the playback of an SVA stereo optical sound-track, a twin element solar cell 206 is located close to the rear of the film 208, and receives the light transmitted through the film sound-track by the projected image of the slit. A rotating sound drum 209 positions the film between the light source/slit and solar cell. An adjustable guide roller 210 provides for precise lateral positioning of the film such that the film sound-track elements LT and RT can be properly aligned laterally with respect to the exciter lamp, slit lens assembly and solar cell. Guide roller 10 is a conventional part of nearly all professional motion picture projectors. The elements 202, 204 and 206 are aligned such that the respective portions of solar cell 206 receive substantially only the light modulated by the respective left and right tracks (LT and RT) when the film is correctly positioned. Current outputs representing the LT and RF signals are thus present on the respective electrical leads 212 and 214 attached to the solar cell pair (lead 215 is a ground lead). Other arrangements for soundheads are well known in the literature. See, for example, the *Audio Cyclopedia,* by Howard M. Tremaine, Second Edition, 1975, Howard W. Sams & Co., Inc., Indianapolis.

Conventional practice with a sound-head intended only to play monaural optical sound-tracks is to use a single element solar cell with a width somewhat in excess of the illuminated 0.084"; projector sound-heads for the playback of four-channel, two-track, SVA films utilize a twin element solar cell, with the two elements separated by a minimal boundary, typically less than 0.001". One pick-up element is positioned to read each track (LT and RT).

Figure 13:
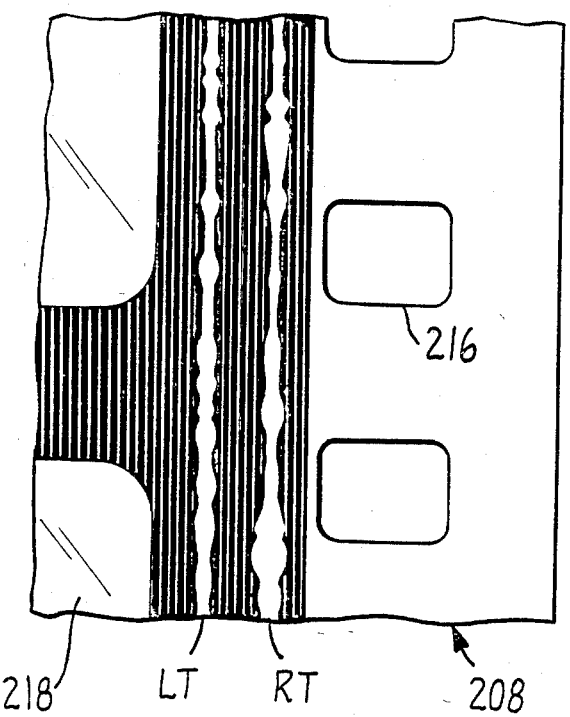
FIG. 13 is a block diagram of an embodiment showing a simple technique for indication of sound-track location errors.

FIG. 13 shows a simple embodiment of the invention of Ioan R. Allen for indicating sound-track location errors, particularly applicable for the playback of SVA optical sound-tracks, or discrete sound-track formats with unilateral edges adjacent to a central septum. An example of the latter type format is described above in connection with FIG. 3. In FIG. 13, the solar cell has four juxtaposed elements instead of the normal two for SVA playback. Overall the four elements (ABCD) have the same dimensions as a conventional split cell for use in reading SVA sound-tracks, however the right and left halves each comprise two cell elements: the larger elment in each half (A and D) exclude an area congruent with the septum region while the additional cell pairs (B and C) are congruent with 0.010" septum. Elements A and B are additively combined in amplifier 220 to create a conventional LT output, and elements C and D added in amplifier 222 to create the RT signal. Elements B and C are each independently amplified by amplifiers 224 and 226 to create error indication signals. Capacitors 228 and 230 provide a hold condition, and the final outputs are sent to two LED's 232 and 234. It will be realized that the 0.010" septum on an SVA film means that with a perfectly aligned system, neither LED will ever light. With a misaligned system, though, a peak level signal on either track will light the relevant LED, thus alerting the projector operator to the error, which can then be corrected with guide roller adjustment. While this simple system would be perfectly effective for sound-track location error indication, it does not address the other typical operational problems discussed above, which can be alleviated through applications of the embodiments of the invention described below.

Figure 14:
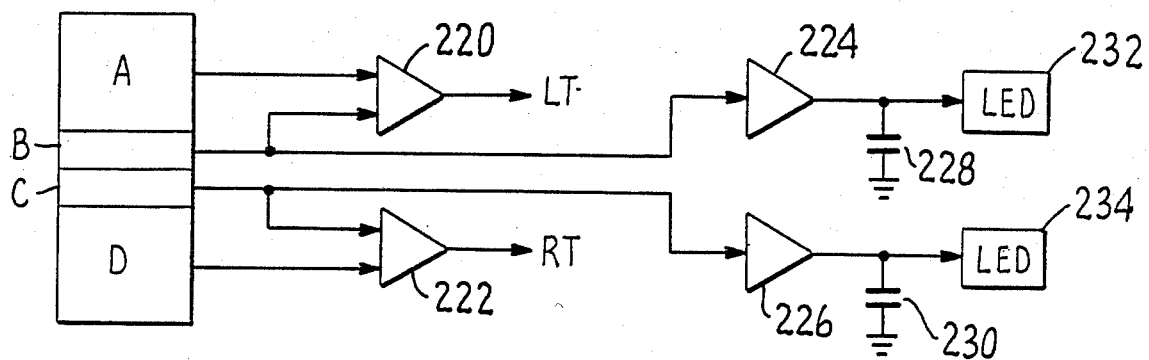
FIG. 14 is a simplified block diagram of a basic embodiment showing the use of a solar cell pair to read a single bilateral sound-track.

FIG. 14 illustrates conceptually the observation on which the said invention of Ioan R. Allen is based. A solar cell pair 236 (a conventional solar cell, split into two substantially equal parts), has its septum aligned with the centerline of a bilateral sound-track element 238 in a sound-head arrangement such as is shown in FIG. 12. The current outputs an electrical leads 240 and 242 from the respective P and Q portions of solar cell 236 are additively combined in amplifier 244 to provide a conventional audio output from the bilateral track. Output 246 is sent to a conventional pre-amplifier. Amplifier 232 has been shown configured to provide a current output as would normally be received by the pre-amplifier; it will be realized that the amplifier could equally well be configured to generate a voltage output. Non-audio error information is available by comparing the signals from the P and Q portions of the solar cell. For, example, the current outputs on leads 240 and 242 are also sent to amplifier 248, where they are subtractively combined to provide an error voltage signal which will be proportional to the difference in light received by the two solar cell elements. For the case of a perfect sound-track and a perfectly aligned optical assembly, the signal on line 250, a function of $(I_P - I_Q)$, will be zero.

Instead of subtractively combining the signals, other comparison techniques can be used. For example, a binary decision can be made depending on the closeness in amplitude of the signals from each half of the bilateral track element. Also, it may be useful to compare the P and Q signals at different sound-track modulation levels. Consider that at high modulation levels any illumination errors will have a greater effect than at low modulation levels because the modulated track width is greater. In addition, any lateral misalignment will be less detectable at high levels than at low levels, as a percentage of the modulated width. Thus in order to distinguish track misalignment and illumination error when examinining a single bilateral track element, it may be useful to compare the P and Q signals at a high level, say above about 80% modulation and at a low level, say below about 30% (but above the noise level). If the signals are about equal at the high level but are different at low levels, then correct illumination is likely but with there is a strong probability of track misalignment.

Comparison of multiple error signals is necessary to detect illumination errors and is useful in providing more accurate results in confirming other error conditions. FIG. 15 shows a circuit which has two twin element solar cells, with elements P, Q, R and S. Cell elements P and Q of solar cell pair 252 receive the light from one bilateral track element, and cell elements R and s of solar cell pair 254 receive the light from another bilateral element. In the same way as described in the previous figure, amplifiers 256 and 258 provide currents proportional to the audio modulation signals, and are sent to suitable conventional audio pre-amplifiers. Amplifiers 260 and 262 generate voltage signals proportional to the error signals generated from each bilateral pair (e.g., the difference signals). Further amplifiers 264 and 266 create combinations of error signals representing (P−Q)+(R−S) and (P−Q)−(R−S) (where P, Q, etc. are the voltage functions derived from the P, Q, etc. solar cells). The output signals from these two amplifiers, 268 and 270, will provide error signals caused by, respectively, film lateral position errors, parabolic illumination errors, azimuth errors and impulse noise. It will be apparent that these principles are also applicable to reproducing films having more than two bilateral sound-track elements, such as described in connection with the four-track and six-track embodiments of the present application of Allen and Todd.

A more accurate determination of the above mentioned error conditions can be made after some signal conditioning. In particular, FIG. 16 shows the output error signal 268 passed through an optical low-pass filter 272. The filtered signal (274) is compared with a reference voltage in comparator 276. The comparator output signal (278) has a polarity which will indicate the direction of the track location error. For example, depending upon the polarity convention used, a positive signal could indicate the sound-track being out of location to the left of the solar cell, and a negative signal would then indicate a displacement to the right.

FIG. 17 shows how the error signal 278 can usefully be applied in practice. With no modifications to the projector soundhead, the error signal can be sent to an amplifier 280 which will switch on one of two alternative LED's (282, 284). Below a certain threshold, neither light will be triggered; above this predetermined threshold one of the LED's would be illuminated; the projectionist would then be alerted to the fact that there was a location error, and could adjust the guide roller position (adjusting the lateral relationship of the film sound-track and the solar cell) until neither light was illuminated. Alternatively, electromechanical means, such as a servo motor arrangement can be used to adjust the guide roller position (see FIG. 19).

A more sophisticated utilization of the error signal is predicated upon the fact that few sound-track location errors exceed 0.004". Errors of this magnitude or smaller can be corrected by movement of the solar cell; it is only with errors in excess of 0.004" that movement of the guide roller, and consequently the film and sound-track itself, become mandatory. With these normal operational sound-track location errors of a magnitude less than 0.004", (typically caused by laboratory printer misalignment, or inaccurate reel splicing of the release print) the varying quasi-DC error signal can be used to correct directly the relative position of the solar cell and the film sound-track. Various mechanisms are possible, including a servo motor adjusting the the solar cell mounting bracket or as in FIG. 18 the error signal can be used to control a piezo-electric crystal 286 which is mounted on the solar cell bracket 288, and which supports the solar cell 290. A maximum excursion of about +/−0.005" is possible from suitable devices, and the Figure shows accordingly how the cell position can be adjusted dynamically to correct the effective sound-track/solar cell relative position; a voltage applied to the crystal (not shown) will effectively adjust the solar cell position until the error signal is zero. Suitable time constants are applied to feedback control circuitry such that there is sufficient damping to avoid unstable and excessive solar cell movement. A similar technique to position a magnetic record/reproduce head is disclosed in U.S. Pat. No. 3,526,726. A lamp can be provided to indicate errors greater than the adjustment range of the piezo-electric crystal to alert the operator to adjust the guide roller.

Errors too large to be compensated by small adjustments of the solar cell assembly can be corrected by a servo motor arrangement controlling the guide roller as shown in FIG. 19. The track location error signals indicating left or right track displacement are integrated in blocks 292 and 294, and applied to comparators 296 and 298, respectively. The comparators have an adjustable reference voltage applied at their other inputs to provide a threshold level for each channel (which can be chosen to allow the arrangement of FIG. 18 to correct small errors). Integrated error signals larger than the set thresholds are applied to a motor control unit 300 that drives a motor 302 in the proper direction to reduce the sound-track misalignment. Suitable time constants are applied to the feedback control circuitry such that there is sufficient damping to avoid unstable and excessive guide roller movement.

We claim:

1. A motion picture film having a photographic sound-track for selective reproduction of monophonic sound when used with conventional moonophonic photographic sound projection apparatus, for reproduction of stereophonic sound when used with conventional stereo variable area (SVA) photographic sound projection apparatus, said SVA sound projection apparatus used conventionally for reproducing a conventional LT SVA track are and a conventional RT SVA track area on motion picture films, for reproduction of four-channel sound when used with 2-4 matrix decoding stereo variable area photographic sound projection apparatus, and for reproduction of discrete four-channel sound when used with appropriate discrete four-channel sound projection apparatus; said sound-track comprising four or six variable area tracks occupying substantially the conventional LT and RT SVA track areas reproduced by conventional stereo variable area sound projection apparatus, said tracks having modulation levels and widths and carrying four channel sound with levels, amplitude and phase relationships such that when the tracks are summed when used with conventional monophonic projection apparatus substantially compatible monophonic sound is reproduced, when the tracks are summed using conventional stereo variable area (SVA) projection apparatus, substantially compatible stereophonic channels are reproduced for use as two-channel sound, for 2-4 matrix decoding into four-channel sound, and when the tracks are separately read by appropriate discrete four-channel sound projection apparatus, discrete four-channel sound is reproduced.

2. A motion picture film according to claim 1 wherein half of said four or six tracks occupy the LT SVA track area and the other half of said tracks occupy the RT SVA track area reproduced by conventional stereo variable area sound projection apparatus, the LT and RT SVA track areas separated by a central septum, the tracks occupying the LT SVA track area substantially carrying the information $$L + 0.7C - 0.7js$$

and the tracks occupying the RT SVA track area substantially carraying the information $$R + 0.7C + 0.7js,$$

where L, C, R and S are the four channels of sound, left, center, right and surround.

3. A motion picture film according to claim 2 wherein there are six tracks; one of the tracks occupying part of the LT SVA track area carrying only left channel (L) sound; one of the tracks occupying part of the RT SVA track area carrying only right channel (R) sound; two tracks, one each occupying part of the remaining LT SVA track area and part of the remaining RT SVA track area, carrying center channel (C) sound; and two tracks, one each occupying part of the yet remaining LT SVA track area and part of the yet remaining RT SVA track area, carrying surround channel (S) sound.

4. A motion picture film according to claim 3 wherein the right and left channel tracks are of substantially equal width and each of the four remaining tracks are of substantially equal width and about 0.7 times the width of either the left or right channel tracks.

5. A motion picture film according to claim 3 or 4 wherein the tracks adjacent the central septum are unilateral tracks each having an unmodulated edge, said unilateral tracks arranged such that the unmodulated edge of each track is adjacent the central septum.

6. A motion picture film according to claim 4 wherein there are four narrow septa in addition to the central septum such that each track is spaced from its adjacent track or tracks, the narrow septa having a width less than that of the central septum.

7. A motion picture film according to claim 6 wherein the narrow septa are no less than about 0.002" each.

8. A motion picture film according to claim 2 wherein there are four tracks, two of the tracks occupying the LT SVA track area and two of the tracks occupying the RT SVA track area, the four tracks carrying 4-4 matrix encoded four channels of sound.

9. A motion picture film according to claim 8 wherein the four tracks are substantially equal in width and each of the two tracks occupying each SVA track position are separated by a septum less than or equal to the central septum.

10. A motion picture film according to claim 9 wherein the septa separating each pair of tracks is no less than about 0.002" each.

11. A motion picture film according to claims 8 or 9 wherein the tracks adjacent the central septum are unilateral tracks arranged such that the unmodulated edge of each track is adjacent the central septum.

12. A motion picture film according to claims 8 or 9 wherein the 4-4 encoding matrix is of the form:

| L | C | R | S | |
|---|---|---|---|---|
| 0.7 | 0 | 0.7 | $-j$ | W |
| 0.7 | 1 | $-0.7$ | 0 | X |
| $-0.7$ | 1 | 0.7 | 0 | Y |
| 0.7 | 0 | 0.7 | $j$ | Z, | where W, X, Y and Z are the information applied to the four tracks, W and X occupying the LT SVA track position and Y and Z occupying the RT SVA track position.

13. A motion picture film according to claims 8 or 9 wherein the 4-4 encoding matrix is of the form:

| L | C | R | S | |
|---|---|---|---|---|
| 0.7 | 1 | $-0.7$ | 0 | W |
| 0.7 | 0 | 0.7 | $-j$ | X |
| 0.7 | 0 | 0.7 | $j$ | Y |
| $-0.7$ | 1 | 0.7 | 0 | Z, | where W, X, Y and Z are the information applied to the four tracks, W and X occupying the LT SVA track position and Y and Z occupying the RT SVA track position.

14. A motion picture film according to claims 8 or 9 wherein the 4-4 encoding matrix is of the form

| L | C | R | S | |
|---|---|---|---|---|
| $0.7 - 0.7j$ | $0.5 + 0.5j$ | 0 | $0.5 - 0.5j$ | W |
| $0.7 + 0.7j$ | $0.5 - 0.5j$ | 0 | $-0.5 - 0.5j$ | X |
| 0 | $0.5 - 0.5j$ | $0.7 + 0.7j$ | $0.5 + 0.5j$ | Y |
| 0 | $0.5 + 0.5j$ | $0.7 - 0.7j$ | $-0.5 + 0.5j$ | Z. |

15. Apparatus for recording motion picture film having a photographic sound-track for selective reproduction of monophonic sound when used with conventional monophonic photographic sound projection apparatus, for reproduction of stereophonic sound when used with stereo variable area (SVA) photographic sound projection apparatus, said SVA sound projection apparatus used conventionally for reproducing a conventional LT SVA track area and a conventional RT SVA track area on motion motion picture films, for reproduction of four-channel sound when used with 2-4 matrix decoding stereo variable area photographic sound projection apparatus, and for reproduction of discrete four-channel sound when used with appropriate discrete four-channel sound projection apparatus; said apparatus comprising means for recording four or six variable area tracks occupying substantially the conventional LT and RT track areas reproduced by conventional stereo variable area sound projection apparatus, said tracks having modulation levels and widths and carrying four channel sound with levels, amplitude and phase relationships such that when the tracks are summed when used with conventional monophonic projection apparatus substantially compatible monophonic sound is reproduced, when the tracks are summed using conventional stereo variable area (SVA) projection apparatus, substantially compatible stereophonic channels are reproduced for use as two-channel sound, for 2-4 matrix decoding into four-channel sound, and when the tracks are separately read by appropriate discrete four-channel sound projection apparatus, discrete four-channel sound is reproduced.

16. Apparatus for recording motion picture film according to claim 15 wherein half of said tracks occupy the LT SVA track area and the other half of said tracks occupy the RT SVA track area reproduced by conventional stereo variable area sound projection apparatus, the LT and RT SVA track areas separated by a central septum, the tracks occupying the LT SVA track area substantially carrying the information $$L+0.7-0.7js$$

and tracks occupying the RT SVA track area substantially carrying the information $$R+0.7C+0.7js,$$

where L, C, R and S are the four channels of sound, left, center, right and surround.

17. Apparatus for recording motion picture film according to claim 15 wherein the apparatus is for recording six tracks; one of the tracks occupying part of the LT SVA track area carrying only left channel (L) sound; one of the tracks occupying part of the RT SVA track area carrying only right channel (R) sound; two tracks, one each occupying part of the remaining LT SVA track area and part of the remaining RT SVA track area, carrying center channel (C) sound; and two tracks, one each occupying part of the yet remaining LT SVA track area and part of the yet remaining RT SVA track area, carrying surround channel (S) sound.

18. Apparatus for recording motion picture film according to claim 15 wherein the apparatus is for recording four tracks, two of the tracks occupying the LT SVA track area and two of the tracks occupying the RT SVA track area, the four tracks carrying 4-4 matrix encoded four channels of sound.

19. Motion picture film sound projection apparatus for reproducing discrete four-channel sound from a photographic sound-track having four or six variable area tracks occupying substantially the LT and RT track areas reproduced by conventional stereo variable area sound projection apparatus, comprising, means for generating an electrical signal in response to each of said tracks when the film is projected, and means for selectively combining said signals to produce four discrete sound channels.

20. The projection apparatus of claim 19 in which the sound-track reproduced has six tracks, one of the tracks occupying part of the LT SVA track area carrying only left channel (L) sound; one of the tracks occupying part of the RT SVA track area carrying only right channel (R) sound; two tracks, one each occupying part of the remaining LT SVA track area and part of the remaining RT SVA track area, carrying center channel (C) sound; and two tracks, one each occupying part of the yet remaining LT SVA track area and part of the yet remaining RT SVA track area, carrying surround channel (S) sound, wherein said means for selectively combining includes means for additively summing in phase the two center channel track signals to provide the center sound channel and means for subtractively summing the two surround channel track signals to produce the surround sound channel.

21. The projection apparatus of claim 20 in which the sound-track reproduced has four tracks, two of the tracks occupying the LT SVA track area and two of the tracks occupying the RT SVA track area to carry the four channels of sound, wherein said means for selectively combining includes means for 4-4 matrix decoding said signals.

* * * * *

UNITED STATES PATENT AND TRADEMARK OFFICE
CERTIFICATE OF CORRECTION

PATENT NO. : 4,577,305

DATED : Mar. 18, 1986

INVENTOR(S) : Allen et al.

Figure 20:
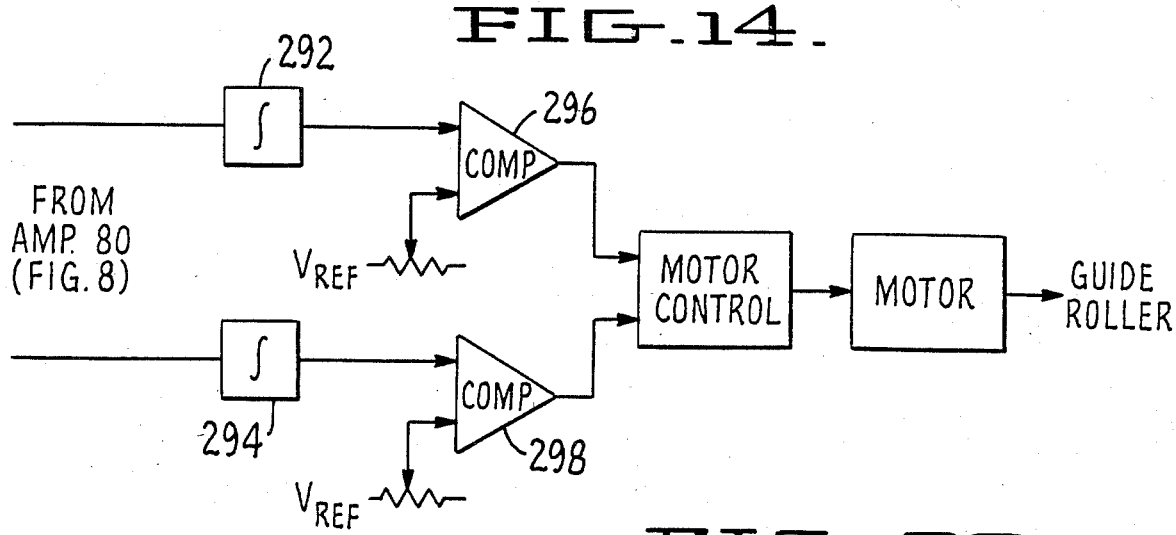
FIG. 20 depicts generally a motor control circuit useful in implementing the invention.

It is certified that error appears in the above-identified patent and that said Letters Patent is hereby corrected as shown below:

```
                FROM                          FROM
Fig. 20:    "AMP. 80"   should read    --AMP. 280-- ;
             (FIG. 8)                   (FIG. 18)

Col. 15, line 10: "solar cell 206" should read --solar cell 216--
         line 18: "roller 10" should read --roller 210--;
         line 20: "206" should read --216--;
         line 22: "206" should read --216--; and
         line 47: "FIG. 3" should read --FIG. 4-- and
                  "FIG. 13" should read --FIG. 14--.

Col. 16, line  7: "FIG. 14" should read --FIG. 15--;
         line 13: "FIG. 12" should read --FIG. 14--;
         line 18: "232" should read --244--;
         line 45: "examinining" should read --examining--;
         line 51: delete "with"; and
         line 56: "FIG. 15" should read --FIG. 16--.

Col. 17, line 14: "FIG. 16" should read --FIG. 17--;
         line 24: "FIG. 17" should read --FIG. 18--;
         line 52: delete the extra "the"; and
         line 53: "FIG. 18" should read --FIG. 19--.

Col. 18, line  6: "FIG. 19" should read --FIG. 20--;
         line 12: "FIG. 18" should read --FIG. 19--;
         line 23: "moonophonic" should read --monophonic--;
         line 29: "are" should read --area--; and
         line 65: "carraying" should read --carrying--.

Col. 19, line 19: "claim" should read --claims--.
```

UNITED STATES PATENT AND TRADEMARK OFFICE
CERTIFICATE OF CORRECTION

PATENT NO. : 4,577,305

DATED : Mar. 18, 1986

INVENTOR(S) : Allen et al.

It is certified that error appears in the above-identified patent and that said Letters Patent is hereby corrected as shown below:

Col. 20, line 30: delete the extra "motion"; and
        line 41: "four channel" should read --four-channel--.

Signed and Sealed this

Eighteenth Day of November, 1986

Attest:

DONALD J. QUIGG

*Attesting Officer*        *Commissioner of Patents and Trademarks*